3,029,473
VACUUM POST-CURING OF INFUSIBLE PLASTIC MATERIAL

Walter H. Greenberg, Syosset, N.Y., assignor to Riverside Plastics Corporation, Hicksville, N.Y., a corporation of New York
No Drawing. Filed May 25, 1959, Ser. No. 815,319
6 Claims. (Cl. 18—48)

The present invention is directed to a process for improving the thermal characteristics of infusible plastic materials, and more particularly to a process for decreasing the effect of thermal shock on infusible molded plastic materials.

One of the principal deficiencies of plastic materials for many uses is the adverse affect thereon of thermal shock and exposure. Thus, in the case of laminated infusible plastic materials, thermal shock will produce blistering and delamination. Furthermore, the mechanical properties of such laminated plastics are adversely affected on being raised to elevated temperatures.

This invention has as its objects the provision of a novel process for improving the thermal and mechanical characteristics of infusible plastic materials, and in particular, infusible plastic laminates; and such other objects as will appear hereinafter.

The aforesaid objects are accomplished by the process of the present invention in which infusible plastic materials are vacuum post-cured, subsequent to being molded. The vacuum post-curing is effected at elevated temperatures for a prolonged time period under moderately high vacuum. The temperatures utilized are sufficiently high to at least partially carbonize the plastic material, were such temperatures attained by the plastic material under atmospheric conditions. The process effects the driving off of volatiles from the plastic material without appreciably carbonizing the plastic material or modifying its size.

I have discovered that the thermal qualities of a wide variety of plastic materials may be substantially improved by the process of the present invention. I have subjected a wide variety of phenolic, tri-allylcyanurate, silicones, epoxy laminates, etc. to the process of this invention, and have tested the resultant laminates and compared the test data with laminates that have been prepared under conventional methods, and have noted an improvement in the thermal qualities of the processed material over the non-processed material. Accordingly, I attribute the advantages of the process of the present invention to physical changes, and in particular the driving off of volatiles, rather than to chemical changes, since the beneficial results obtained by the process of the present invention are broadly applicable.

The vacuum post-curing should be effected at the best possible vacuum which is readily attainable. This will vary, dependent upon the particular circumstances, but generally, the vacuum should be at least equal to a pressure equivalent to 10 cm. of mercury, preferably of the order of 5 cm. of mercury, and less. The vacuum post-curing should be of a substantial duration, such as at least ten hours. The temperature and time to which the plastic material should be raised may be varied over a broad range, depending upon the material being treated and the vacuum attainable. A certain amount of minor pretesting may be required when work is commenced upon a new material. However, with most plastic materials, vacuum post-curing should be effected up to a maximum temperature of the order of about 450° F. to 600° F. when operating at a pressure of the order of five centimeters of mercury. When operating at higher pressures, somewhat lower temperatures and more prolonged post-curing can to a considerable degree compensate for the lack of vacuum.

While I do not wish to be bound by any theory as to the mechanism of the present invention, it is my belief that the removal of air and the reduction in the vapor pressure of the volatiles within the laminates, are at least partly responsible. Thus, I believe the removal of air reduces the tendency of the laminate to carbonize, and the removal of the volatiles reduces the tendency of the laminates to blister.

The following examples are to be deemed as illustrative of the process of the present invention. It is, of course, to be understood that anyone working with the process of the present invention may be required to make a certain minor amount of pretesting prior to preparing batches, and such minor amount of pretesting comes within the skill of a worker in the art. It is assumed that such worker would not be desirous of operating the process of the present invention in a non-useful manner.

Example I

A laminate was formed from a modified phenol formaldehyde resin designated "Phenolic 91LD" obtained from the Cincinnati Testing Laboratories of Cincinnati, Ohio, applied to a type 181 glass fabric. The laminate was formed by impregnating an alcoholic solution of the modified phenol formaldehyde monomer onto the fiber glass fabric, followed by evaporating off the alcohol solvent with heat. Twelve plies of the aforesaid impregnated glass fabric were laminated together in a molding press at a pressure of 100 pounds per square inch, a temperature of 325° F., and for a time duration of fifteen minutes. This yielded a laminate having a thickness of one-eighth inch.

One half of the laminate panel obtained as above was utilized as the control, and the other half was subjected to the process of the present invention. This comprised vacuum post-curing such panel within a vacuum chamber located in an oven at the following temperatures for the following time durations at a pressure of five centimeters of mercury:

From room temperature the panel was heated to 300° F. under the aforesaid vacuum and maintained at 300° F. for six and one-half hours. The panel was then gradually heated to 450° F., and maintained at 450° F. for ten hours at the vacuum. From this temperature the panel was gradually heated to the temperatures set forth hereinafter and for the time periods set forth hereinafter, with the panel being maintained under the aforesaid vacuum for the entire post-curing treatment: 480° F. for two hours; then 515° F. for five hours; then 550° F. for twelve hours; and finally to 600° F. for two hours. After the aforesaid vacuum post-curing, the panel was allowed to cool to room temperature while being maintained under the vacuum.

A cooled trap in the vacuum line revealed the presence of a substantial amount of condensate of unknown composition. The appearance and odor of the condensate varied with the extent of the vacuum post-curing and the temperature to which the laminate was raised. The initial vacuum post-curing produced a milky liquid having a waxy smell, the subsequent post-curing produced first a brown liquid having an ammonia-type smell, and finally a brown highly viscous material having an acrid odor.

It was noted that the panel showed some weight loss, but very little sign of carbonization.

A portion of the control was subjected to a post-curing at similar temperatures, but in the absence of vacuum. The percentage weight loss of such control specimen after the post-curing was not as great as that of the panel produced by the process of the present invention, but evidenced an appreciable amount of carbonization.

Comparisons of tensile strengths were made between the laminates processed by the vacuum post-curing method of the present invention, and the non-post-cured control and the non-vacuum post-cured control. Since the non-vacuum post-cured control possessed better tensile strength characteristics than the non-post-cured control only the comparison between the non-vacuum post-cured control and the laminate of the present invention will be set forth below:

| Temperature and Time Exposure at Which Tensile Strength Test Effected | Tensile Strength of Panels Processed By Present Invention, p.s.i. | Tensile Strengths of Control Non-Vacuum Post-Cured Panels, p.s.i. |
|---|---|---|
| Room Temperature | 44,700 | 45,200 |
| 500° F., ½ hour | 42,000 | 30,000 |
| 800° F., 2 Minutes | 40,000 | Collapse |
| 800° F., ½ Minute | 40,000 | Collapse |
| 1,000° F., ½ Minute | 26,400 | Collapse |

By "collapse" as used in the aforesaid table is meant the falling apart of the laminations and the complete destruction of the control panel.

Flexural tests were also performed and revealed the following:

| Temperature and Time Exposure at Which Flexural Strength Test Effected | Flexural Strength of Panels Processed By Present Invention, p.s.i. | Flexural Strengths of Control Non-Vacuum Post-Cured Panels, p.s.i. |
|---|---|---|
| Room Temperature | 86,800 | 70,400 |
| 500° F., ½ hour | 57,700 | 53,200 |
| 800° F., ½ hour | 25,100 | 19,500 |

The modulus of elasticity for the panels of the present invention compared with the controls were as follows:

| Temperature and Time Exposure at Which Modulus of Elasticity Determined | Modulus of Elasticity of Panels Processed By Present Invention | Modulus of Elasticity of Control Non-Vacuum Panels |
|---|---|---|
| Room Temperature | $3.92 \times 10^6$ | $2.99 \times 10^6$ |
| 500° F., ½ hour | $3.43 \times 10^6$ | $2.46 \times 10^6$ |
| 800° F., ½ hour | $2.08 \times 10^6$ | $1.89 \times 10^6$ |

*Example II*

A plastic laminate was prepared according to the procedure of Example I, and was vacuum post-cured in accordance with the following schedule: vacuum post-curing for eight hours at 350° F. at a pressure of three centimeters of mercury, then vacuum post-curing for sixteen hours at 420° F. at a pressure of six centimeters of mercury, and then vacuum post-curing for eight hours at a temperature of 480° F. at a pressure of nine centimeters of mercury, following which the panels were cooled to room temperature gradually under the vacuum.

These panels demonstrated an average weight loss of 0.569 weight percent. Control panels which were similarly post-cured, but without being subjected to a vacuum showed an average weight loss of 0.267 percent. There was no detectable difference in thickness between the vacuum post-cured panels and the control panels revealing that the weight loss was due entirely to the loss of volatiles and not to thermal decomposition.

The panels which were vacuum post-cured in accordance with this example were heated to 1400° F. and showed no sign of blistering or delamination. The control panels blistered and delaminated at a temperature of approximately 800° F.

The present invention may be embodied in other specific forms without departing from the spirit or essential attributes thereof and, accordingly, reference should be made to the appended claims, rather than to the foregoing specification as indicating the scope of the invention.

I claim:

1. A process for improving the thermal characteristics of a molded infusible plastic material which comprises heating such plastic material for an extended time period under vacuum and at temperatures which would be sufficiently high to partially carbonize the plastic material were such temperatures attained by the plastic material under atmospheric conditions whereby volatiles are driven from the heated plastic material without appreciably carbonizing the plastic material.

2. A process in accordance with claim 1 in which the vacuum during the heating of the plastic material is less than a pressure of ten centimeters of mercury.

3. A process in accordance with claim 1 in which the time duration of heating is at least ten hours.

4. A process in accordance with claim 1 in which the plastic material comprises a plastic laminate.

5. A process in accordance with claim 4 in which the plastic laminate is formed from a phenol-formaldehyde resin and in which the phenol-formaldehyde resin laminate is heated to a temperature of approximately 450° F. to 600° F.

6. A process for improving the thermal characteristics of a molded infusible plastic laminate formed from a phenol-formaldehyde resin which comprises heating said laminate for at least ten hours under a vacuum equal to a pressure of less than ten centimeters of mercury at an elevated temperature of up to about 450° F. to 600° F.

References Cited in the file of this patent

UNITED STATES PATENTS

| 1,374,526 | Redman | Apr. 12, 1921 |
| 1,602,249 | Peakes | Oct. 5, 1926 |
| 2,037,375 | Freeman | Apr. 14, 1936 |
| 2,223,394 | Thompson | Dec. 3, 1940 |
| 2,337,903 | Lauck | Dec. 28, 1943 |
| 2,641,801 | Batchelor et al. | June 16, 1953 |
| 2,790,206 | Cofek | Apr. 30, 1957 |
| 2,869,194 | Cooper | Jan. 20, 1959 |
| 2,869,195 | Cooper et al. | Jan. 20, 1959 |
| 2,869,196 | Cooper et al. | Jan. 20, 1959 |
| 2,870,110 | Cooper et al. | Jan. 20, 1959 |